Figure 1:
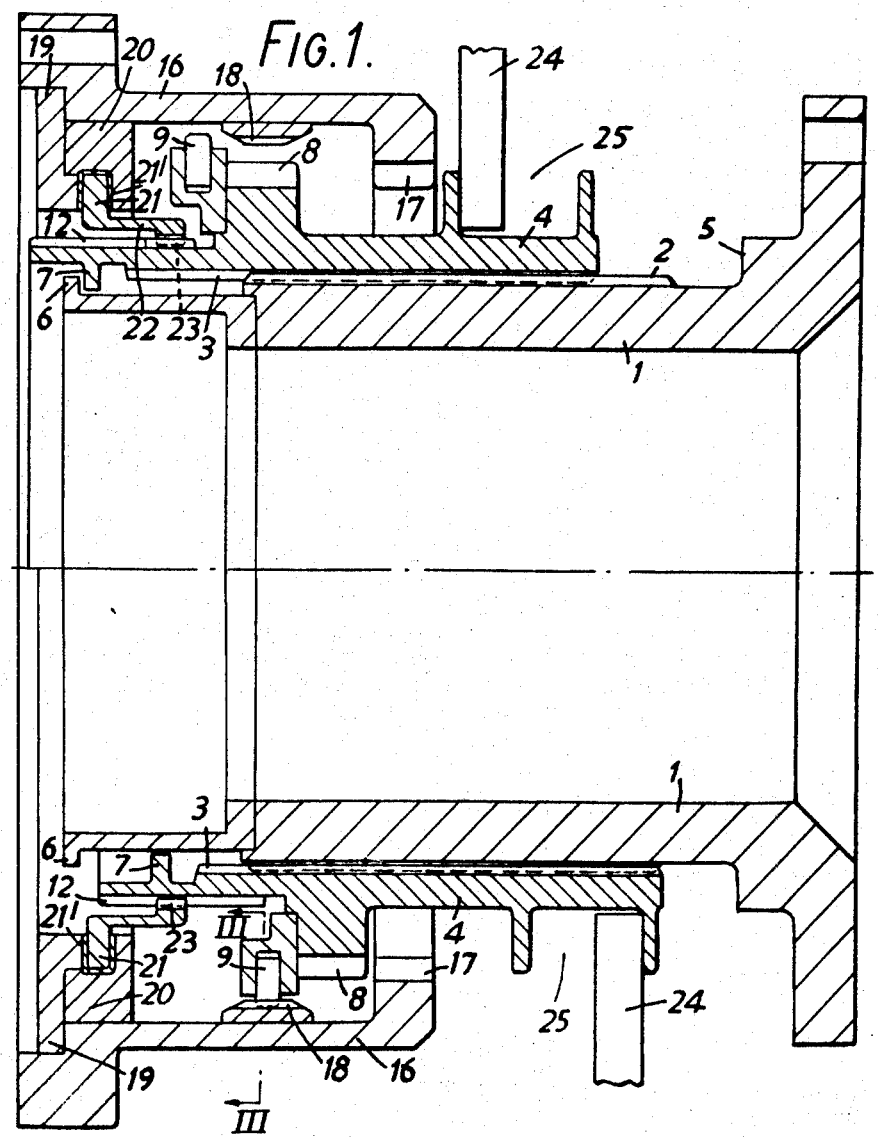

United States Patent [19]

Heybourne et al.

[11] 3,715,019
[45] Feb. 6, 1973

[54] SYNCHRONOUS SELF-SHIFTING CLUTCHES

[75] Inventors: Robert Howard Heybourne, East Molesey, Surrey; Herbert Arthur Clements, Oatlands Park, Weybridge, Surrey, both of England

[73] Assignee: S.S.S. Patents Limited, London, England

[22] Filed: May 3, 1971

[21] Appl. No.: 120,425

[30] Foreign Application Priority Data

March 11, 1970 Great Britain.....................11,614/70

[52] U.S. Cl.............192/67 A, 192/53 G, 192/53 H, 192/114 R
[51] Int. Cl.............................................F16d 23/08
[58] Field of Search....192/46, 47, 53 G, 53 H, 67 A, 192/114 R

[56] References Cited

UNITED STATES PATENTS 2,908,367  10/1959  Sinclair.............................192/53 H X
2,913,084  11/1959  Short................................192/67 A Primary Examiner—Allan D. Hermann
Attorney—Woodcock, Phelan & Washburn

[57] ABSTRACT

In pawl and ratchet mechanism capable of being set selectively to a pawl free condition or to a ratcheting condition, baulking means are provided which operate in response to relative rotation of the pawls and ratchet teeth to permit or prevent a change from the pawl free condition to the ratcheting condition according to whether the direction of relative rotation is appropriate or inappropriate for the change to be made.

The invention is applicable to toothed clutches wherein pawl and ratchet mechanism is employed for automatically aligning the clutch teeth for interengagement.

10 Claims, 10 Drawing Figures

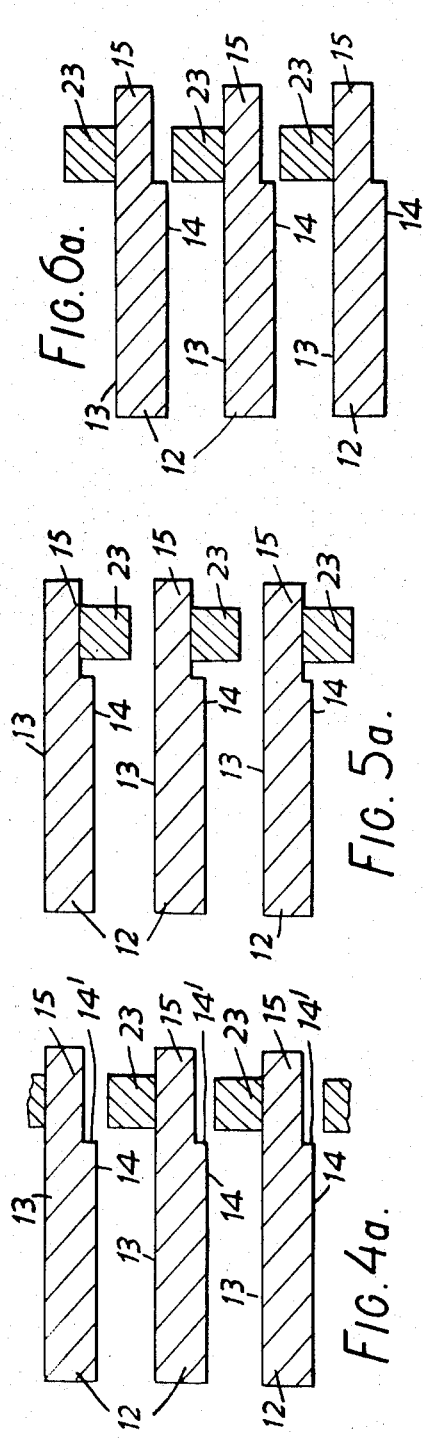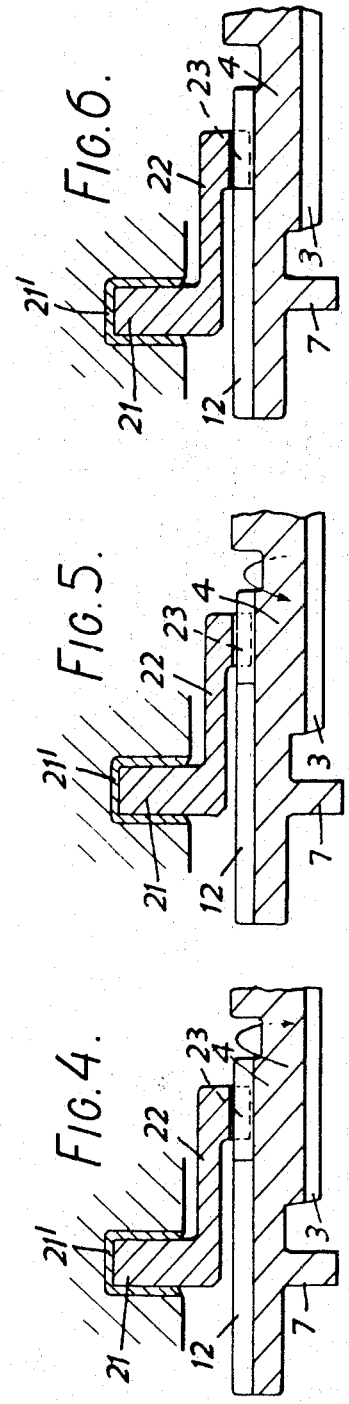

SYNCHRONOUS SELF-SHIFTING CLUTCHES

This invention relates to pawl and ratchet mechanism and particularly but not exclusively to pawl and ratchet mechanism incorporated in a toothed clutch for automatically aligning the clutch teeth for interengagement upon relative rotation of the clutch input and output parts in one direction. Such mechanisms are normally unidirectionally free, that is to say for one direction of relative rotation of the elements of the pawl and ratchet mechanism, viz. the pawls on the one hand and the ratchet teeth on the other hand, the mechanism overruns with the pawls ratcheting relative to the ratchet teeth, whereas for the other direction of relative rotation pawls engage ratchet teeth.

In some applications of such mechanisms it is necessary to make provision for a bi-directionally free condition. Such a condition may for example be achieved by shifting the pawls axially away from the ratchet teeth, or conversely by shifting the ratchet teeth axially away from the pawls, to a position in which they are incapable of ratcheting, or by turning the pawls to positions in which their noses are out of the paths of the ratchet teeth. Such a condition may be termed a pawl free condition.

For the mechanism to be returned from the pawl free condition to a unidirectionally free condition in which the pawls are in ratcheting relationship with the ratchet teeth it is essential that the direction of relative rotation of the elements of the pawl and ratchet mechanism should be in the overrunning direction; since the effect of attempting to return the mechanism from the pawl free condition to the ratcheting condition with the said elements in rapid relative rotation in the direction opposite to the direction for overrunning would be that pawls and rachet teeth would come into violent contact resulting in damage to the pawls and/or to the ratchet teeth.

The object of the invention is to overcome this problem, and in accordance with the invention means are provided which are responsive to relative rotation of the elements of the pawl and ratchet mechanism to prevent a change from the pawl free condition to the unidirectionally free ratcheting condition when the direction of relative rotation of the said elements is inappropriate for such a change, but to permit a change from the pawl free condition to the unidirectionally free ratcheting condition when the direction of relative rotation of said elements is appropriate for such a change.

Figure 3:
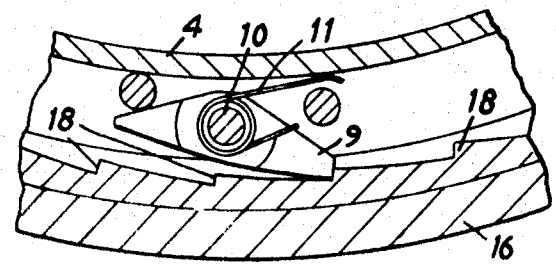
Figure 2:
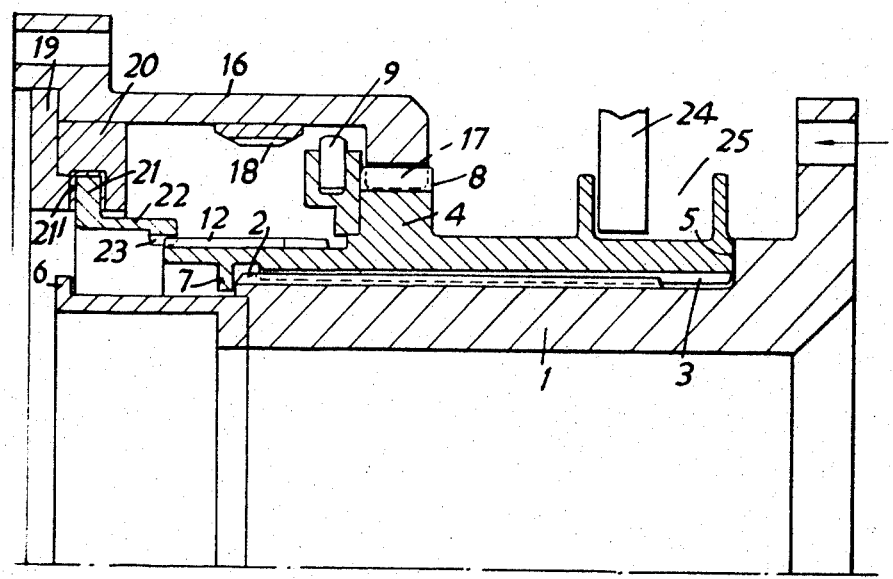

In the accompanying drawings,

FIG. 1 is a view in side sectional elevation of a synchronous self-shifting toothed clutch embodying the invention. The upper half of the Figure shows the clutch in a pawl free viz. bi-directionally free condition and the lower half of the Figure shows the clutch in a unidirectionally free condition in which the pawls are in ratcheting relationship with the ratchet teeth, FIG. 2 is a view of the upper half of the clutch in side sectional elevation, showing the clutch in the engaged condition, FIG. 3 is a sectional view on the line III—III of FIG. 1, FIGS. 4, 5 and 6 are detail sectional views, on a larger scale than FIG. 1, showing baulking teeth and a baulking ring in the relative positions that they assume for various conditions of the clutch, FIGS. 4a, 5a and 6a are development views of baulking teeth and blocking teeth, the Figures corresponding respectively to FIGS. 4, 5 and 6, and FIG. 7 is a detail view illustrating a modification of the baulking teeth and blocking teeth.

Referring to the drawings, the clutch includes a first part 1 formed with external left-hand helical splines 2 with which are engaged internal helical splines 3 in an intermediate member 4, which is thereby constrained for helical movement relative to the clutch part 1, the said helical movement being limited in one direction by an axial stop formed by an annular shoulder 5 on the clutch part 1 and in the other direction by an axial stop formed by an annular flange 6 on a ring 7 fixed to the part 1, the flange 6 cooperating with a radially inwardly projecting annular flange 7 in the intermediate member 4. The intermediate member 4 is formed with a ring of external clutch teeth 8, and carries pawls 9 the noses of which point in anticlockwise direction as viewed from the righthand end of the clutch (FIG. 3). The pawls 9 are mounted on pawl pins 10 and are provided with control springs 11 which urge the noses of the pawls radially outwardly. The intermediate member 4 is also formed with a ring of external baulking teeth 12, each of which (FIGS. 4a, 5a and 6a) has a straight flank 13 and a flank 14 which is stepped to form a part 15 of reduced circumferential thickness at one end of the tooth. As seen from the left-hand end of the clutch in FIG. 1, the straight flanks 13 of the baulking teeth 12 face in the anticlockwise direction and the stepped flanks 13 face in the clockwise direction.

A second clutch part is constituted by a sleeve 16 carrying a ring of internal clutch teeth 17 and a ring of internal ratchet teeth 18. The sleeve 16 also carries annular members 19 and 20 shaped so as to provide between them an internal groove, in which is accommodated a ring 21 forming part of a blocking tooth carrier. A white metal bearing 21' is provided between the ring 21 and its groove. The carrier also includes a cylindrical member 22 which projects from the inner periphery of the ring 21 and carries a ring of internal blocking teeth 23 which are interengaged with the baulking teeth 12.

With the clutch in the unidirectionally free condition, as shown in the lower half of FIG. 1, the external clutch teeth 8 are out of engagement with the internal clutch teeth 17, and the pawls 9 are in ratcheting relationship with the ratchet teeth 18. With the clutch output part 16 rotating in anticlockwise direction relative to the clutch input part 1 as seen from the right-hand end of the clutch (see FIG. 3), the pawls 9 ratchet relative to the ratchet teeth 18 and the clutch overruns.

The ring 21 forming part of the blocking tooth carrier is rotatably slidable in its lubricated bearing 21'. When the clutch parts 1 and 16 are in relative rotation in the overrunning direction as above described, the drag on the ring 21 of the blocking tooth carrier, due to the friction between the ring 21 and the bearing 21', is such that the blocking teeth 23 are maintained in contact with the straight flanks 13 of the baulking teeth 12.

When the direction of relative rotation of the clutch parts 1 and 16 reverses, pawls 9 engage ratchet teeth 18 and the intermediate member 4 is thereby shifted helically, to the right in FIG. 1, along the input part 1 so as to bring the external clutch teeth 8 precisely into initial interengagement with the internal clutch teeth 17, whereupon the interaction of the clutch teeth 8 and 17 in conjunction with the helical splines 2 and 3 draws the intermediate member 4 into full toothed engagement with the second clutch part 16 and against the axial stop 5, so that the clutch is engaged (FIG. 2). When the direction of relative rotation of the clutch parts 1 and 16 again reverses, the interaction of the clutch teeth 8 and 17 in conjunction with the helical splines 2 and 3 shifts the intermediate member 4 to the left so as to bring the external clutch teeth 8 out of engagement with the internal clutch teeth 17 and to bring the pawls 9 back into ratcheting engagement with the ratchet teeth 18, as shown in the lower half of FIG. 1. During these movements of the intermediate member 4 the straight flanks 13 of the baulking teeth 12 slide relative to the blocking teeth 23.

As so far described, the clutch is unidirectionally free, that is to say for one direction of relative rotation of the clutch parts 1 and 16 the clutch overruns with the pawls 9 ratcheting relative to the ratchet teeth 18, whereas upon reversal of the direction of relative rotation of the clutch parts 1 and 16 the clutch engages as above described.

In order to bring the clutch to a condition of bidirectional freedom, viz., the pawl free condition, the intermediate member 4 is shifted to the left from the position shown in the lower half of FIG. 1 to a position in which the pawls 9 are axially clear of the ratchet teeth 18, as shown in the upper half of FIG. 1. This movement of the intermediate member 4 may for example be effected by operating an axially movable control fork 24 engaged with lost motion in an external annular groove 25 in the intermediate member 4. During this movement of the intermediate member 4 the baulking teeth 12 move so far to the left that the blocking teeth 23 move on to the parts 15 of the baulking teeth 12 of reduced circumferential width. So long as the direction of relative rotation of the clutch part 1 and intermediate member 4 relative to the clutch part 16 corresponds to the ratcheting direction of relative rotation of the pawls 9 and ratchet teeth 18, as shown by the arrow in FIG. 4, the blocking teeth 23 are held in contact with the straight flanks 13 of the baulking teeth 12 (FIG. 4a) by the frictional drag on the blocking tooth carrier due to the friction between the ring 21 and the surfaces of the bearing 21' in which it is accommodated. Hence it is possible, by operating the control fork 24, to shift the intermediate member 4 to the right to bring the pawls 9 into ratcheting relationship with the ratchet teeth 18 (lower half of FIG. 1). If however while in the pawl free condition, the direction of relative rotation of the clutch parts 1 and 16 is in the opposite direction (indicated by the arrow in FIG. 5) the blocking teeth 23 are held, by frictional drag, against the flanks of the narrow parts 15 of the baulking teeth 12, on the stepped sides 14 thereof as shown in FIG. 5a. Hence if an attempt is made to shift the intermediate member 4 to the right the steps on the baulking teeth 12 come into axial engagement with the blocking teeth 23 so as to prevent further movement of the intermediate member 4 to the right such as would bring the pawls 9 into contact with the ratchet teeth 18 and cause damage.

The operator is therefore obliged to wait for the direction of relative rotation of the clutch parts 1 and 16 to reverse before the intermediate member 4 can be shifted to the right. When such reversal takes place, the frictional drag on the blocking tooth carrier 21, 22 brings the blocking teeth 23 on to the straight flanks of the baulking teeth 12 (FIG. 4a), so that there is no longer any obstruction to movement of the intermediate member 4 to the right to bring the pawls 9 into ratcheting relationship with the ratchet teeth 18.

If, with the clutch in the pawl free condition (FIG. 6) the intermediate member 4 is shifted to the right whilst the clutch parts 1 and 16 are stationary relatively to one another, intermediate member 4 moves helically relative to the clutch output part 16 and the baulking teeth 12 move helically relative to the blocking teeth 23, as shown by the arrow in FIG. 6a. When the clutch is in the pawl free condition the blocking teeth 23 are spaced sufficiently far in the axial direction from the steps of the baulking teeth 12 such that upon movement of the intermediate member 4 to the right the helical movement of the baulking teeth 12 relative to the blocking teeth 23 causes the steps of the baulking teeth 12 to pass clear of the blocking teeth 23, so that the movement of the intermediate member 4 to the pawl ratcheting position is unimpeded. Hence the intermediate member 4 can be shifted from the pawl free condition to the ratcheting condition when the clutch parts 1 and 16 are stationary relatively to each other without being impeded by the baulking means.

The frictional drag exerted on the rings 21 of the blocking tooth carrier may be arranged to be higher for one direction of relative rotation of the ring 21 in its bearing 21' than for the other direction, such as to assist disengagement of the blocking teeth 23 from the steps of the baulking teeth 12 when the direction of relative rotation of the clutch parts 1 and 16 become appropriate for shifting of the intermediate member 4 from the pawl free position to the pawl ratcheting position.

Figure 7:
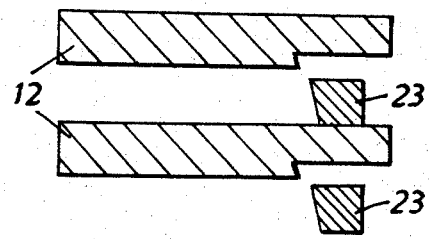

As illustrated in FIG. 7, the baulking teeth 12 and the blocking teeth 23 may be undercut so as to provide an interlocking action between the baulking teeth and the blocking teeth.

In a modification (not illustrated) instead of a ring of baulking teeth and a ring of blocking teeth, there may be provided a single baulking tooth and a single blocking tooth. In this case, in the pawl free condition the blocking tooth will bear against the straight flank of the baulking tooth when the direction of relative rotation of the elements of the pawl and ratchet mechanism is appropriate for a change to the unidirectionally free condition, whereas the blocking tooth will bear against the narrow part of the stepped flank of the baulking tooth when the direction of relative rotation of the said elements is inappropriate for such a change.

The invention may be incorporated in synchronous self-shifting clutches wherein an intermediate member is movable axially relative to the second clutch member and the movement of the intermediate member to initiate interengagement of the clutch teeth is brought about by the coaction of pawls and ratchet teeth having helical coacting faces, as described in United States Pat. No. 3,458,021.

What is claimed is:

1. Pawl and rachet mechanism of the type comprising a first rotary element, at least one pawl carried by said first rotary element, a second rotary element, at least one ratchet tooth carried by said second rotary element, said mechanism further being of the type that includes means mounting said first and second rotary elements for relative movement to and from a pawl free condition of the mechanism, characterized by impeding means which, with the mechanism in the pawl free condition, are responsive to relative rotation of said first and second rotary elements in a direction which is inappropriate for a change of the mechanism from the pawl free condition to assume an operative condition in which said impeding means impede such a change, said impeding means being responsive to relative rotation of said first and second rotary elements in the other direction to assume an inoperative condition in which a change of the mechanism from the pawl free condition is permitted.

2. Pawl and ratchet mechanism according to claim 1 wherein the said elements are mounted for relative axial movement from a ratcheting condition to a pawl free condition and vice versa, and wherein the said impeding means comprise blocking teeth rotatable with one of said elements, and baulking teeth movable angularly relative to the other of said elements, the baulking teeth each having a flank against which a flank of a blocking tooth bears when said elements are in a pawl free condition and are in relative rotation in the direction appropriate for a change from the pawl free condition, said flanks being mutually shaped to permit said change, and said baulking teeth each having a flank against which a flank of a blocking tooth bears when said elements are in a pawl free condition and are in relative rotation in the direction inappropriate for such a change, said last-mentioned flanks of the baulking teeth and blocking teeth being mutually shaped to provide obstruction to such a change.

3. Pawl and ratchet mechanism according to claim 1 wherein the said elements are mounted for relative axial movement from a ratcheting condition to a pawl free condition and vice versa, and wherein the said impeding means comprise blocking teeth rotatable with one of said elements and baulking teeth interengaged with said blocking teeth and angularly movable relative to the other of said elements, the baulking teeth each having a flank against which, in the pawl free condition of the mechanism, a blocking tooth bears when the direction of relative rotation of said elements is inappropriate for a change from the pawl free condition, said flank being stepped to obstruct relative movement of the baulking tooth and blocking tooth corresponding to such a change, said baulking teeth each having a further flank against which, in the pawl free condition of the mechanism, a blocking tooth bears when the direction of relative rotation of said elements is appropriate for a change to the pawl free condition, which further flank is shaped to permit such change without substantial obstruction.

4. A toothed clutch comprising input and output parts, engageable and disengageable sets of clutch teeth, and pawl and ratchet mechanism according to claim 3 for automatically aligning said sets of clutch teeth for interengagement upon relative rotation of said input and output parts in one direction.

5. A synchronous self-shifting toothed clutch comprising a first rotary clutch part, clutch teeth carried by said first clutch part, a second rotary clutch part, an intermediate member, clutch teeth on said intermediate member, means constraining said intermediate member for helical movement relative to said second clutch part to bring the clutch teeth of said intermediate member into and out of interengagement with the clutch teeth of said first clutch part, and pawl and ratchet mechanism in accordance with claim 3, the said elements of said pawl and ratchet mechanism being carried by said first clutch member and said intermediate member respectively, said pawl and ratchet mechanism, when out of the pawl free condition, being effective upon passage of said first and second clutch parts through synchronism in one direction of relative rotation, to shift said intermediate member into at least initial interengagement of its clutch teeth with the clutch teeth of said first clutch member.

6. Pawl and ratchet mechanism according to claim 1 wherein the said impeding means include at least one baulking member rotatable with one of said elements and at least one blocking member angularly movable relative to the other of said elements, said baulking member and said blocking member being mutually shaped such that a change from the pawl free condition is impeded by the interaction of said blocking member and said baulking member when the direction of relative rotation of said elements is inappropriate for such a change, whereas such change is unimpeded when the direction of relative rotation of said elements is appropriate for such a change.

7. Pawl and ratchet mechanism according to claim 1 wherein the said means include a baulking tooth rotatable with one of said elements and a blocking tooth angularly movable relative to the other of said elements, said baulking tooth having a flank against which, in the pawl free condition of the mechanism, a flank of said blocking tooth bears when the direction of relative rotation of said elements is appropriate for a change from the pawl free of the mechanism, which flanks are mutually shaped to permit relative shifting of said baulking tooth and said blocking tooth corresponding to such a change, said baulking tooth having a further flank against which a further flank of said blocking tooth bears when, in the pawl free condition of the mechanism, the direction of relative rotation of said elements is inappropriate for such a change, said further flanks being mutually shaped to provide obstruction to selective shifting of said baulking and said blocking tooth corresponding to such a change.

8. A clutch comprising input and output parts, engageable and disengageable sets of clutch teeth, and pawl and ratchet mechanism according to claim 1 for automatically aligning said sets of clutch teeth for interengagement upon relative rotation of said input and output parts in one direction.

9. A synchronous self-shifting toothed clutch comprising a first rotary clutch part, clutch teeth carried by said first clutch part, a second rotary clutch part, an intermediate member, clutch teeth carried by said intermediate member, means constraining said intermediate member for helical movement relative to said second clutch part to bring the clutch teeth of said intermediate member into and out of interengagement with the clutch teeth of said first clutch part, and pawl and ratchet mechanism according to claim 1, said pawl and ratchet mechanism when out of pawl free condition being effective, upon passage of said first and second clutch parts through synchronism in one direction of relative rotation, to shift said intermediate member into at least initial interengagement of its clutch teeth with the clutch teeth of said first clutch part.

10. Pawl and ratchet mechanism according to claim 1 including means constraining said elements for relative helical movement whereby a change into and out of the pawl free condition involves relative helical movement of said elements, and wherein the arrangement of said impeding means is such that with said elements stationary relative to one another and in the pawl free condition a change from the pawl free condition can be made unimpeded by said impeding means.

* * * * *